United States Patent

Nakai

(10) Patent No.: US 10,029,408 B2
(45) Date of Patent: Jul. 24, 2018

(54) WELDING APPARATUS AND WELDING METHOD

(71) Applicants: Adwelds Corporation, Chikushi-gun, Fukuoka (JP); PMT Corporation, Kasuya-gun, Fukuoka (JP)

(72) Inventor: Seiya Nakai, Fukuoka (JP)

(73) Assignees: Adwelds Corporation, Fukuoka (JP); PMT Corporation, Fukuoka (JP)

( * ) Notice: Subject to any disclaimer, the term of this patent is extended or adjusted under 35 U.S.C. 154(b) by 350 days.

(21) Appl. No.: 14/779,637

(22) PCT Filed: Apr. 7, 2014

(86) PCT No.: PCT/JP2014/060087
§ 371 (c)(1),
(2) Date: Sep. 24, 2015

(87) PCT Pub. No.: WO2014/168111
PCT Pub. Date: Oct. 16, 2014

(65) Prior Publication Data
US 2016/0052194 A1    Feb. 25, 2016

(30) Foreign Application Priority Data

Apr. 10, 2013  (JP) .................................. 2013-081719
Jun. 10, 2013  (JP) .................................. 2013-121964
Feb. 28, 2014  (JP) .................................. 2014-037842

(51) Int. Cl.
*B32B 37/00*    (2006.01)
*B29C 65/08*    (2006.01)
(Continued)

(52) U.S. Cl.
CPC .............. *B29C 65/08* (2013.01); *B23K 20/10* (2013.01); *B23K 20/103* (2013.01);
(Continued)

(58) Field of Classification Search
CPC ... B29C 65/08; B29C 65/086; B29C 65/7894; B29C 66/1122; B29C 66/343; B29C 66/3452; B23K 20/10; B23K 20/103
(Continued)

(56) References Cited

U.S. PATENT DOCUMENTS 5,085,719 A * 2/1992 Eck ......................... B29C 65/08
                                                    156/580.1
7,025,841 B2 * 4/2006 Owen .................... B29C 65/086
                                                      156/290
(Continued)

FOREIGN PATENT DOCUMENTS

FR  2829961 A1    3/2003
GB  1010324       11/1965
(Continued)

*Primary Examiner* — James Sells
(74) *Attorney, Agent, or Firm* — Norris McLaughlin & Marcus, P.A.

(57) ABSTRACT

A compact pressing body with a pressing surface smaller in area than a welding range welds together sheet-like members over the whole area of the welding range by pressing the sheet-like members being reliably moved in a direction substantially orthogonal to a pressing direction of the pressing body.

2 Claims, 9 Drawing Sheets

(51) Int. Cl.
*B23K 20/10* (2006.01)
*B29C 65/00* (2006.01)
*B29C 65/78* (2006.01)
*B32B 37/06* (2006.01)
*B32B 37/20* (2006.01)
*B32B 37/10* (2006.01)

(52) U.S. Cl.
CPC ........ *B29C 65/086* (2013.01); *B29C 65/7891* (2013.01); *B29C 65/7894* (2013.01); *B29C 66/1122* (2013.01); *B29C 66/343* (2013.01); *B29C 66/3452* (2013.01); *B29C 66/45* (2013.01); *B29C 66/7212* (2013.01); *B29C 66/7392* (2013.01); *B29C 66/8169* (2013.01); *B29C 66/8223* (2013.01); *B29C 66/8242* (2013.01); *B29C 66/836* (2013.01); *B29C 66/83411* (2013.01); *B29C 66/92445* (2013.01); *B29C 66/92615* (2013.01); *B29C 66/92921* (2013.01); *B29C 66/9512* (2013.01); *B29C 66/9516* (2013.01); *B32B 37/06* (2013.01); *B32B 37/20* (2013.01); *B29C 66/7394* (2013.01); *B29C 66/81425* (2013.01); *B32B 37/1045* (2013.01); *B32B 2310/028* (2013.01)

(58) Field of Classification Search
USPC .................................. 156/73.1, 580.1, 580.2
See application file for complete search history.

(56) References Cited

U.S. PATENT DOCUMENTS

2003/0183315 A1  10/2003  McMahon et al.
2010/0096065 A1   4/2010  Yamamoto

FOREIGN PATENT DOCUMENTS

| JP | 58-020434 | 2/1983 |
| JP | 2-159273 | 6/1990 |
| JP | 11-198233 | 7/1999 |
| JP | 2008-284696 A | 11/2008 |
| JP | 2010-099132 | 5/2010 |

* cited by examiner

WELDING APPARATUS AND WELDING METHOD

TECHNICAL FIELD

The present invention relates to a technique for welding together a plurality of overlaid sheet-like members by pressing in conjunction with application of vibration.

BACKGROUND ART

There has heretofore been known a technique where with the overlaid sheet-like members clamped and pressured between a backup surface of a stage and a pressing surface of a horn (pressing body), ultrasonic vibration is induced in a horn which applies the ultrasonic vibration to the sheet-like members and thus, the overlaid sheet-like members are welded together. In this case, the overlaid sheet-like members clamped and pressured between the pressing surface and the backup surface are welded together in one stroke by application of the ultrasonic vibration. However, the following problem is encountered when the sheet-like members are welded together over a wide area.

To weld together the overlaid sheet-like members over the wide area in one stroke, it is required to provide a large pressing body including a wide pressing surface such that the sheet-like members can be collectively pressured over the whole area of a welding range by pressing the sheet-like members against the backup surface in a pressing direction. In this case, however, the pressing surface of the ultrasonically vibrating pressing body exhibits a great difference in the magnitude of amplitude between spaced positions on the pressing surface as well as an increased phase difference therebetween. It is therefore difficult for the pressing surface to uniformly apply the ultrasonic vibration of the same amplitude to the sheet-like members over the whole area of a pressing range. Further, the provision of the large pressing body having the wide pressing surface also dictates the need to increase a driving force for driving the pressing body in the pressing direction in order that the wide pressing surface achieves a predetermined magnitude of pressure. Accordingly, support means for supporting the pressing body also needs to have a large structure, which leads to another problem that the apparatus per se is increased in size.

Accordingly, there has been proposed a method where the sheet-like members, as pressed against the backup surface in the pressing direction by the pressing surface smaller in the area than the welding range, are moved in a direction substantially orthogonal to the pressing direction whereby the sheet-like members are pressed against the backup surface over the whole area of the welding range (see, for example, Patent Document 1). According to an apparatus disclosed in the patent document 1, the overlaid sheet-like members moved in the direction substantially orthogonal to the pressing direction are welded together over the whole area of the welding range by being pressured by the pressing surface smaller in the area than the welding range. The driving force required for driving the pressing body in the pressing direction to apply a predetermined pressure via the small pressing surface is smaller than the driving force required for driving the large conventional pressing body. Since the compact pressing body having the small pressing surface is applicable to the apparatus, the overlaid sheet-like members can be welded together by the apparatus having a compact structure.

PRIOR-ART DOCUMENT

Patent Document

Patent Document 1: Japanese Unexamined Patent Publication No. H11(1999)-198233 (Paragraphs 0010, 0011, FIGS. 1 to 3, Abstract and the like)

SUMMARY OF THE INVENTION

Technical Problem

Depending upon the element such as material, thickness or the like of the sheet-like members as a welding object, there is a need for increasing a pressure applied by the pressing surface of the pressing body pressing the sheet-like members against the backup surface. If the pressure on the sheet-like members is too great, however, the following problem may be encountered by the apparatus of the patent document 1, where the sheet-like members are welded by being pressured as moved in the direction substantially orthogonal to the pressing direction of the pressing body. Frictional force increases with the increase in the pressure and hence, it is difficult to move the plural sheet-like members clamped and pressured between the backup surface and the pressing surface. This may lead to misalignment between the sheet-like members or breakage of the sheet-like members at worst.

In view of the above problems, the invention has an object to provide a technique that permits a compact pressing body having a pressing surface smaller in the area than the welding range to weld together the sheet-like members over the whole area of the welding range by pressing the sheet-like members via the pressing surface while reliably moving the sheet-like members in the direction substantially orthogonal to the pressing direction of the pressing body.

Solution to the Problem

According to a first aspect of the invention for achieving the above object, a welding apparatus for welding together a plurality of overlaid sheet-like members by pressing in conjunction with application of vibration, includes: a backup member including a backup surface; a pressing body including a pressing surface smaller in the area than a welding range of the sheet-like members, and operative to press the sheet-like members against the backup surface in a pressing direction by means of the pressing surface thereof; movement means for moving a portion of the sheet-like members that faces the pressing surface relative to the pressing surface in a direction substantially orthogonal to the pressing direction; and vibration generating means for vibrating the pressing body, wherein the vibration generating means includes: an oscillator which applies ultrasonic vibration to the sheet-like members from the pressing surface by inducing the ultrasonic vibration in the pressing body; and a pressuring part for pressuring the sheet-like members by pressing the sheet-like members against the backup surface by means of the pressing surface of the ultrasonically vibrating pressing body, and wherein the pressuring part drives the pressing body, ultrasonically vibrated by the oscillator, to repeatedly pressure the sheet-like members during a predetermined pressuring time in one cycle of a preset low-frequency vibration period while maintaining the pressing body in low-frequency vibration with the low-frequency vibration period in a vibrational direction parallel to the pressing direction.

The movement means may move the backup member at a constant speed in the direction substantially orthogonal to the pressing direction, the backup member carrying the overlaid sheet-like members fixedly placed on the backup surface thereof (second aspect).

Further, the movement means may also move the backup member in the direction substantially orthogonal to the pressing direction with a movement speed during the pressuring time set lower than a movement speed during a time period other than the pressuring time in one cycle of the low-frequency vibration period, the backup member carrying the overlaid sheet-like members fixedly placed on the backup surface thereof (third aspect).

According to a fourth aspect of the invention for achieving the above object, a welding method for welding together a plurality of overlaid sheet-like members by pressing in conjunction with application of vibration has an arrangement wherein when a pressing body including a pressing surface formed smaller in the area than a welding range of the sheet-like members pressures the sheet-like members in a pressing direction by pressing the sheet-like members against a backup surface of a backup member by means of the pressing surface thereof, the pressing body, as ultrasonically vibrated by an oscillator, repeatedly pressures the sheet-like members during a predetermined pressuring time in one cycle of a preset low-frequency vibration period, while being maintained in low-frequency vibration with the low-frequency vibration period in a vibrational direction parallel to the pressing direction, and in the meanwhile a portion of the sheet-like members that faces the pressing surface is moved relative to the pressing surface in a direction substantially orthogonal to the pressing direction.

Effects of the Invention

According to the first and fourth aspects of the invention, when the overlaid sheet-like members are welded together under exposure to the vibration, the pressing body including the pressing surface smaller in the area than the welding range of the sheet-like members is driven in the pressing direction by the pressuring part of the vibration generating means. In the state where the pressing surface of the pressing body driven by the pressuring part pressures the sheet-like members in the pressing direction by pressing the sheet-like members against the backup surface of the backup member, the ultrasonic vibration is applied to the sheet-like members by the pressing surface of the pressing body maintained in the ultrasonic vibration by the oscillator of the vibration generating means. At this time, the pressuring part drives the pressing body to repeatedly pressure the sheet-like members during the predetermined pressuring time in one cycle of the low-frequency vibration period while maintaining the pressing body, ultrasonically vibrated by the oscillator, in the low-frequency vibration with the preset low-frequency vibration period in the vibrational direction parallel to the pressing direction. In the period of the low-frequency vibration induced in the pressing body by the pressuring part, therefore, the portion of the sheet-like members that faces the pressing surface can be reliably moved by the movement means in the direction substantially orthogonal to the pressing direction of the pressing body at a time when the pressure of the pressing body pressing the sheet-like members against the backup surface is lowered in the time period other than the pressuring time or in the pressuring time.

Therefore, the following effect can be accomplished by properly setting the speed of the movement means moving the sheet-like members relative to the pressing surface and the period of the low-frequency vibration of the pressing body driven by the pressuring part. Namely, in conjunction with the application of the ultrasonic vibration to the sheet-like members by the compact pressing body including the pressing surface smaller in the area than the welding range, the ultrasonically vibrating pressing body is driven to repeatedly pressure the sheet-like members during the pressuring time as maintained in the low-frequency vibration in the pressing direction, while the portion of the sheet-like members that faces the pressing surface can be reliably moved by the movement means in the direction substantially orthogonal to the pressing direction. Thus, the compact pressing body is adapted to weld together the sheet-like members over the whole area of the welding range while continuously and reliably shifting the position for the pressing surface thereof to press the sheet-like members.

According to the second aspect of the invention, the backup member with the overlaid sheet-like members fixedly placed on the backup surface thereof is moved by the movement means at the constant speed in the movement direction substantially orthogonal to the pressing direction. Therefore, the portion of the sheet-like members that faces the pressing surface can be welded together easily while being moved at the constant speed in the above-described movement direction.

According to the third aspect of the invention, the movement means moves the backup member in the direction substantially orthogonal to the pressing direction with the movement speed in the pressuring time set lower than the movement speed in the time period other than the pressuring time in one cycle of the low-frequency vibration period, the backup member carrying the overlaid sheet-like members fixedly placed on the backup surface thereof. Therefore, the portion of the sheet-like members that faces the pressing surface can be moved in the above-described movement direction at the movement speed changed to the higher level or to the lower level. During the pressuring time when the pressing surface of the pressing body presses the sheet-like members against the backup surface so as to produce a great frictional force therebetween, the movement speed of the movement means moving the backup member with the sheet-like members fixedly placed on the backup surface thereof is lowered. This is effective to obviate the problem that the frictional force produced during the pressuring time causes the misalignment between the sheet-like members clamped between the pressing surface and the backup surface or the breakage of the sheet-like members.

DESCRIPTION OF THE EMBODIMENTS

First Embodiment

Figure 1:
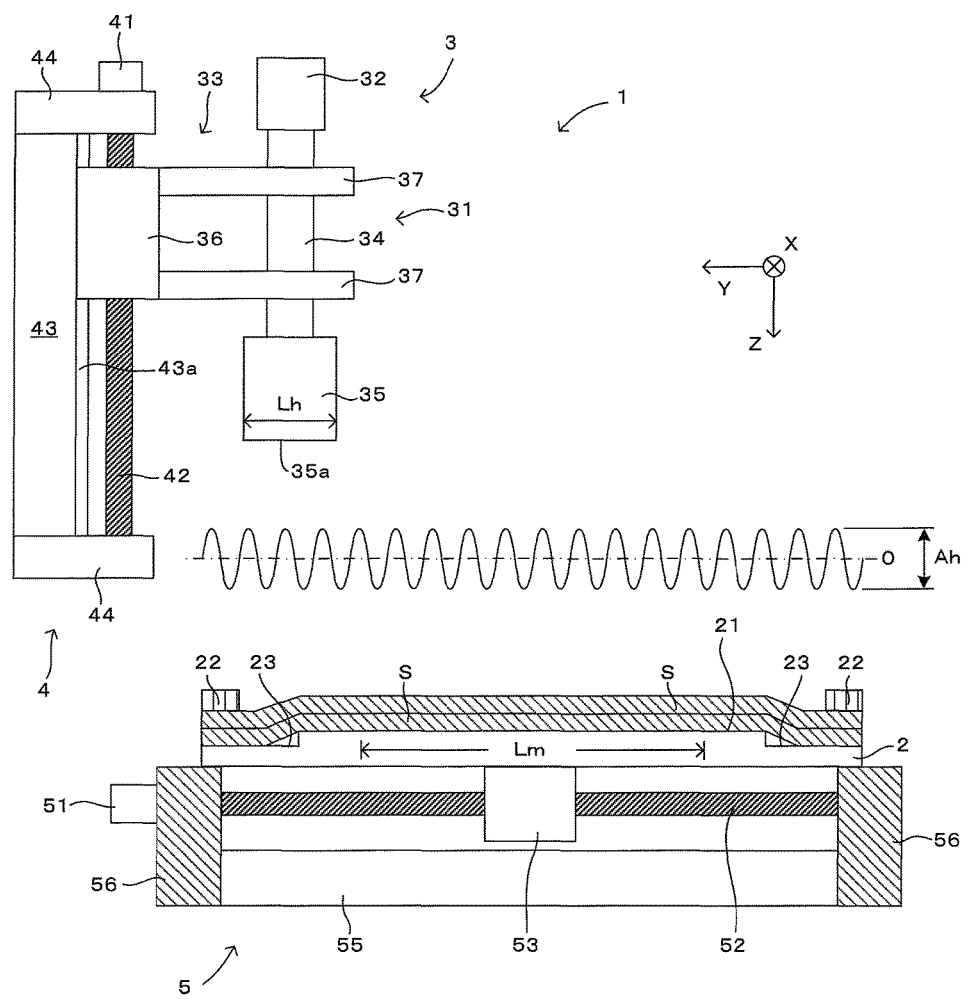
FIG. 1 is a side view showing a welding apparatus according to a first embodiment of the invention.
Figure 2:
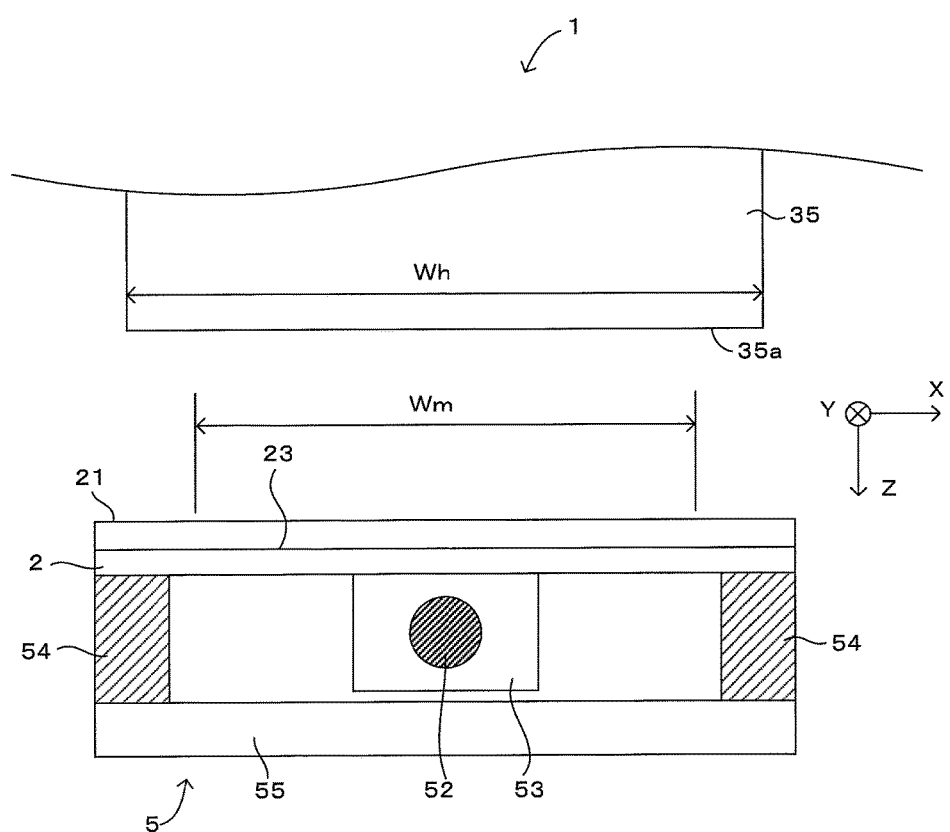
FIG. 2 is an enlarged view of an essential part of the welding apparatus of FIG. 1 as seen from the front.
Figure 3:
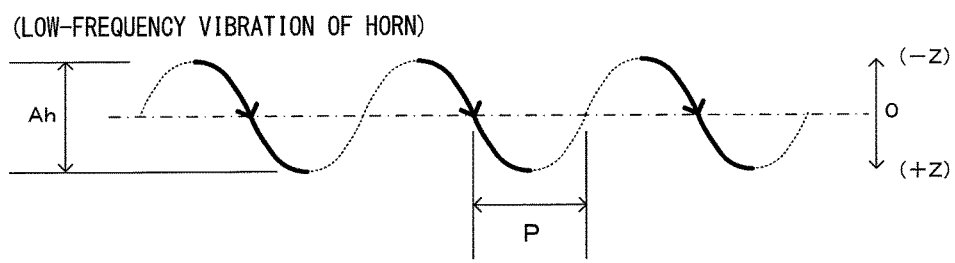
FIG. 3 is a chart for illustrating a vibration mode of a pressing body.

A first embodiment of the invention is described with reference to FIG. 1 to FIG. 3. FIG. 1 is a side view showing a welding apparatus according to the first embodiment of the invention. FIG. 2 is an enlarged view of an essential part of the welding apparatus of FIG. 1 as seen from the front. FIG. 3 is a chart for illustrating a vibration mode of a pressing body.

Welding Apparatus

A welding apparatus 1 shown in FIG. 1 and FIG. 2 is adapted for ultrasonically welding together a plurality of overlaid sheet-like members S by pressing and pressuring the sheet-like members in conjunction with application of vibration. The welding apparatus includes: a stage 2; a head part 3 including a resonator 31 for applying ultrasonic vibration to the sheet-like members S; pressuring means 4 for driving the resonator 31 supported by support means 33 into reciprocal movement in a direction of arrow Z or a pressing direction; movement means 5 for driving the stage 2 into reciprocal movement in a direction of arrow Y (movement direction) substantially orthogonal to the pressing direction; and a controller (not shown) for controlling individual parts of the welding apparatus 1. The sheet-like member S may be composed of nonwoven fabric; metal sheet or metal foil such as that made of Cu, Al, Au, Ni, Ag or the like; carbon fiber composite; or thermoplastic or thermosetting resin sheet, or otherwise composed of semiconductor wafer or circuit board having junctions; laminate substrate made of synthetic resin; resin board or a laminate of these.

The stage 2 (equivalent to "backup member" of the invention) includes a backup surface 21 on which the overlaid sheet-like members S are fixedly placed. The backup surface 21 is provided with a general retention mechanism (not shown) such as vacuum suction mechanism, electrostatic attraction mechanism and mechanical chuck mechanism. The overlaid sheet-like members S are placed on the backup surface 21 by being retained by the retention mechanism. The sheet-like members S placed on the backup surface 21 have opposite ends with respect to the direction of arrow Y clamped between elongate plate-like clamp members 22 and flange parts 23 formed at opposite sides of the stage 2 with respect to the direction of arrow Y, and in a direction of arrow X, respectively. The sheet-like members are fixedly placed on the backup surface 21 by being fastened to place by unillustrated screws or bolts.

The head part 3 includes: the resonator 31 having an oscillator 32 (vibration generating means) connected to a first end thereof; and the support means 33 for supporting the resonator 31. The oscillator 31 induces ultrasonic vibration in the resonator 31 (horn 35), which applies the ultrasonic vibration to the sheet-like members S via a pressing surface 35a thereof.

Specifically, the resonator 31 is adapted to resonate with the ultrasonic vibration that the oscillator 32 generates under the control of the controller, thus ultrasonically vibrating in an axial direction thereof. The resonator includes a booster 34 and the horn 35. A second end of the booster 34 and a first end of the horn 35 are coupled together with headless screw in a manner that center axes of the booster and the horn are in a coaxial relation.

According to this embodiment, the booster 34 is formed to be as long as one wavelength of a resonant frequency such that a substantial central position of the booster in the direction of arrow Z in FIG. 1, for example, and positions of the opposite ends thereof may define maximum amplitude points. It is noted here that two points ¼ wavelength away from the respective maximum amplitude points in the direction of arrow Z corresponds to first and second minimum amplitude points of the booster 34, respectively. The booster 34 is formed in a columnar configuration having a circular cross section. The oscillator 32 is coupled to a first end of the booster 34 with the headless screw in a manner that the oscillator is in a coaxial relation with the center axis of the booster 34.

The booster 34 is formed with gripped parts on an outer peripheral surface thereof which are defined by recessed grooves circumferentially formed at places corresponding to the first and second minimum amplitude points. The gripped parts are for allowing the booster 34 (resonator 31) to be gripped by the support means 33. While the booster 34 according to this embodiment is formed with the gripped parts having an octagonal cross section substantially orthogonal to the center axis of the booster 34, the gripped parts may be formed to have a cross section of a circular shape or other polygonal shapes.

The horn 35 (equivalent to "pressing body" of the invention) includes the pressing surface 35a smaller in the area than a welding range. The horn presses the sheet-like members S against the backup surface 21 of the stage 2 via the pressing surface 35a in the pressing direction Z and applies the ultrasonic vibration to the sheet-like members S via the pressing surface 35a by ultrasonically vibrating in resonance with the vibration of the oscillator 32. The horn 35 is formed to be as long as a half wavelength of the resonant frequency such that opposite end positions thereof in the direction of arrow Z in FIG. 1, for example, may define the maximum amplitude points. It is noted here that a substantial central position of the horn 35 in the direction of arrow Z corresponds to a third minimum amplitude point. As shown in FIG. 1 and FIG. 2, the horn 35 is formed in a rectangular parallelepiped configuration. Relative to the welding range, the pressing surface 35a of the horn 35 has a greater width (width of horn 35 width of welding range Wm) in a width direction X substantially orthogonal to the pressing direction Z and the movement direction Y, and a shorter length Lh in the movement direction Y (length of horn 35 Lh<length of welding range Lm).

According to this embodiment, the resonator 31 is configured to have resonant frequencies of about 15 kHz to about 60 kHz and vibrational amplitude of about 2 μm to about 300 μm. The resonator 31 is brought into ultrasonic vibration in resonance with the ultrasonic vibration generated by the oscillator 32 so that the ultrasonic vibration is applied to the sheet-like members S from the pressing surface 35a of the horn 35.

The support means 33 includes a base 36 and clamp means 37 and is adapted to support the resonator 31 by holding the gripped parts of the booster 34 by means of the clamp means 37. The base 36 is formed with a screw hole in the direction of arrow Z which threadably engages with a ball screw 42 of the pressuring means 4.

The clamp means 37 is disposed at two places of the base 36 so as to be able to hold the two gripped parts formed at the booster 34. Each of the clamp means includes first and second members for clamping the gripped part of the booster 34 therebetween. Specifically, the first and second members of the clamp means 37 are each provided with a recess having a configuration engageable with a cross sectional configuration of the gripped part. In order to clamp the gripped part of the booster 34 between the recesses of the first and second members, the first and second members of the clamp means 37 supported by the base 36 are fittably inserted in the recess defining the gripped part and are fixed in position with a bolt. Thus, the gripped part of the booster 34 is gripped by the clamp means 37.

The structure of the support means 33 for supporting the resonator 31 is not limited to the clamp means 37 which is fixed in position by the bolt as clamping the gripped part formed at the booster 34, as described above. The support means may have any structure that can support the gripped part of the booster 34, such as exemplified by a mechanical clamp mechanism that is electrically controllable, a clamp mechanism adapted for snap-on mounting, and the like.

The position of the gripped part formed at the resonator 31 is not limited to the minimum amplitude point. The gripped part may be formed at any position on the resonator 31. Further, the structure of the gripped part is not limited to the recessed groove circumferentially formed in the outer peripheral surface of the resonator 31 but may include, for example, a protruded flange circumferentially formed on the outer peripheral surface of the resonator 31. The gripped part may be formed in any configuration that permits the support means 33 to hold the gripped part. Further, the gripped part may also be supported by the support means 33 via an elastic member such as an O-ring or diaphragm.

The pressuring means 4 (equivalent to "pressuring part", "vibration generating means" of the invention) drives the resonator 31 toward the stage 2 or away from the stage 2 in the pressing direction Z, the resonator 31 supported by the support means 33 in a manner to present the pressing surface 35a of the horn 35 to the backup surface 21 of the stage 2. The pressuring means includes a drive motor 41 and the ball screw 42. A guide 43 is connected to a support (not shown) erected on a stand (not shown). The pressuring means 4 is coupled to the support and the guide 43 via a frame 44.

The drive motor 41 rotates under the control of the controller so that the support means 33 threadably engaged with the ball screw 42 is moved up and down in the movement direction Z while maintaining sliding contact between a guide (not shown) formed at the support means 33 and a protruded rail 43a extended on the guide 43 in the direction of arrow Z. Thus, the resonator 31 supported by the support means 33 is moved toward the stage 2 or away from the stage 2.

The pressuring means 4 is configured to move the resonator 31 supported by the support means 33 toward the stage 2 with a predetermined pressure by adjusting a driving torque of the drive motor 41 under the control of the controller. The pressuring means 4 is also configured to bring the resonator 31 supported by the support means 33 into vibration with the predetermined vibration period and a predetermined amplitude in the pressing direction Z by switching the rotational direction of the drive motor 41 between positive rotation and reverse rotation according to the predetermined vibration period under the control of the controller.

The support is provided with a linear encoder (not shown), by which the height of the head part 3 is detected. Based on a detection signal from the linear encoder, the controller controls the drive motor 41 so as to adjust the height of the head part 3.

The resonator 31 is supported by the support means 33 in a manner that the center axis of the resonator 31 extends in the same direction as that of the screw hole formed through the base 36, namely, the center axis of the resonator 31 extends in substantially the same direction as the movement direction (pressing direction Z) of the resonator 31 driven by the pressuring means 4 and that the pressing surface 35a of the horn 35 faces the stage 2. Therefore, the resonator 31 (horn 35) is driven in the pressing direction Z in conjunction with the base 36 moved down by the pressuring means 4 so that the resonator and the base are unitarily moved toward the stage 2. Thus, the pressuring means 4 applies the pressure to the sheet-like members S placed on the backup surface 21 of the stage 2 via the pressing surface 35a. Under the control of the pressuring means 3, the pressing surface 35a of the ultrasonically vibrating horn 35 pressures by pressing the sheet-like members S against the backup surface 21 of the stage 2.

As shown in FIG. 1 and FIG. 3, the pressuring means drives the resonator 31, in ultrasonic vibration induced by the oscillator 32, to repeatedly pressure the sheet-like members S during a predetermined pressuring time P in one cycle of a preset low-frequency vibration period, while maintaining the resonator in sinusoidal low-frequency vibration with the vibration period (about Hz to about 1 kHz: equivalent to "low-frequency vibration period" of the invention) and an amplitude Ah (about 0.01 mm to about 5.0 mm) in a vibrational direction parallel to the pressing direction Z. It is noted that the term "low-frequency vibration" in this embodiment means vibration at lower frequencies than that of the ultrasonic vibration induced by the oscillator 32. According to the embodiment, for example, the vibration period is set to about 5 Hz to about 100 Hz and the amplitude Ah is set to about 0.1 mm to about 2.0 mm. According to the embodiment, the controller controls the pressuring means 4 in the vibration period of the low-frequency vibration of the resonator 31 in a manner that the pressuring means 4 applies a constant pressure of a predetermined value to the sheet-like members S in the pressing direction Z during a time period when the resonator 31 moves down as indicated by the solid line in FIG. 3. This embodiment is arranged such that the pressing surface 35a at a position O as the center of the low-frequency vibration is contacted on the sheet-like members S. Therefore, the sheet-like members S are pressured by the pressing surface 35a with the constant pressure during a length indicated by the solid line in the pressuring time P shown in FIG. 3.

The position where the pressing surface 35a of the horn 35 is contacted on the sheet-like members S is not limited to the position O as the center of the low-frequency vibration. If there is a need for lengthening the time for the sheet-like members S to be pressured by the pressing surface 35a, for example, an arrangement may be made such that the horn 35 brings the pressing surface 35a into contact against the sheet-like members S when moved to the vicinity of an upper limit position or moved down a little from the upper limit position. Furthermore, if there is a need for shortening the time for the sheet-like members S to be pressured, for example, an arrangement may be made such that the horn 35 brings the pressing surface 35*a* into contact against the sheet-like members S when moved further down from the center position O of the vibration. Further, the pressuring means 4 may also be controlled by the controller in a manner that the pressuring means applies the constant pressure of the predetermined value in the +Z direction during the whole length of the pressuring time P shown in FIG. 3.

The movement means 5 moves the stage 2 in the movement direction Y at a constant speed so as to move a portion of the sheet-like members S that faces the pressing surface 35*a* relative to the pressing surface 35*a* at the constant speed in the movement direction Y substantially orthogonal to the pressing direction Z. The movement means includes: a drive motor 51; a ball screw 52; a movement member 53 formed with a screw hole threadably engaged with the ball screw 52; and guides 54.

As shown in FIG. 2, the stage 2 is supported by the guides 54 on a lower side thereof as reciprocally movably guided in the direction of arrow Y (movement direction Y). The guides 54 are disposed on the opposite sides of a base 55 with respect to the direction of arrow X and extended in the direction of arrow Y. The ball screw 52 is disposed substantially centrally of the base 55 with respect to the direction of arrow X and has a longitudinal axis extended in the direction of arrow Y. The ball screw 52 is supported by frames 56 disposed on the opposite sides of the base 55 with respect to the direction of arrow Y in a manner to be free to rotate about the center axis thereof as the rotational center. The movement member 53 is in threadable engagement with the ball screw 52 and connected to the lower side of the stage 2.

The drive motor 51 coupled to one end of the ball screw 52 is rotated under the control of the controller so that the movement member 53 threadably engaged with the ball screw 52 is reciprocated in the movement direction Y. Thus, the stage 2 connected to the movement member 53 is reciprocated in the movement direction Y as guided by the guides 54.

Welding Processing

Next, description is made on an example of a welding processing performed by the welding apparatus 1.

First, a plurality of overlaid sheet-like members S is fixedly placed on the backup surface 21 of the stage 2 at a predetermined position. Subsequently, the stage 2 is driven by the movement means 5 so that a leading end of the welding range of the sheet-like members S in the movement direction Y (the left-hand side as seen on the drawing surface of FIG. 1) is positioned at a position opposite the pressing surface 35*a* of the horn 35. Next, the head part 3 is driven by the pressuring means 4 in the pressing direction Z so that the pressing surface 35*a* of the horn 35 pressures the overlaid sheet-like members S by pressing the sheet-like members S against the backup surface 21 of the stage 2 in the pressing direction Z.

Subsequently, the oscillator 32 is driven to induce ultrasonic vibration in the resonator 31, the pressing surface 35*a* of which starts to apply the ultrasonic vibration to the sheet-like members S. At the same time, the pressuring means 4 starts to vibrate the ultrasonically vibrating resonator 31 at low frequencies. Then, the stage 2 is driven by the movement means 5 so as to start moving the sheet-like members S relative to the pressing surface 35*a* at the constant speed in the movement direction Y (to the left-hand side as seen on the drawing surface of FIG. 1).

When a trailing end of the welding range in the movement direction Y (the right-hand side as seen on the drawing surface of FIG. 1) is moved to the position opposite the pressing surface 35*a* of the horn 35 by means of the stage 2 driven by the movement means 5 in the movement direction Y, the ultrasonic vibration of the resonator 31 induced by driving the oscillator 32 and the low-frequency vibration of the resonator 31 caused by the pressuring means 4 are stopped. When the resonator 31 is driven by the pressuring means 4 in a direction to move away from the stage 2 and brought to a predetermined standby position, the welding processing is terminated.

According to this embodiment as described above, the horn 35 (resonator 31) including the pressing surface 35*a* smaller in the area than the welding range of the sheet-like members S is driven by the pressuring means in the pressing direction Z when the overlaid sheet-like members S are welded together under exposure to the vibration. In the state where the pressing surface 35*a* of the horn 35 driven by the pressuring means 4 pressures the sheet-like members S in the pressing direction Z by pressing the sheet-like members S against the backup surface 21 of the stage 2, the oscillator 32 induces the ultrasonic vibration in the horn 35, which applies the ultrasonic vibration to the sheet-like members S via the pressing surface 35*a* thereof. In this process, the pressuring means 4 causes the horn 35 to repeatedly pressure the sheet-like members S during the pressuring time P in one cycle of the low-frequency vibration period, while maintaining the horn 35 ultrasonically vibrated by the oscillator 32 in the low-frequency vibration with the preset low-frequency vibration period in the vibrational direction parallel to the pressing direction Z. In the low-frequency vibration period of the horn 35 driven by the pressuring means 4, therefore, the portion of the sheet-like members S that faces the pressing surface 35*a* can be reliably moved by the movement means 5 in the movement direction Y substantially orthogonal to the pressing direction Z of the horn 35 at a time when the pressure of the horn 35 pressing the sheet-like members S against the backup surface 21 is lowered in a time period other than the pressuring time P and in the pressuring time P.

Therefore the following effect can be accomplished by properly setting the speed of the movement means 5 moving the sheet-like members S relative to the pressing surface 35*a* and the period of the low-frequency vibration of the horn 35 driven by the pressuring means 4. That is, the compact horn 35 having the pressing surface 35*a* smaller in the area than the welding range is operated to repeatedly pressure the sheet-like members S in conjunction with the application of the ultrasonic vibration during the pressuring time P in which the ultrasonically vibrating horn 35 is maintained in the low-frequency vibration. In the meantime, the portion of the sheet-like members S that faces the pressing surface can be reliably moved in the movement direction Y substantially orthogonal to the pressing direction Z by the movement means 5 moving the stage 2 in the movement direction Y. The movement means 5 moves the stage 2 with the sheet-like members S fixedly placed thereon in the movement direction Y so as to move the backup surface (the sheet-like members S) of the stage 2 relative to the pressing surface 35*a* of the horn 35 in the direction of arrow Y. Thus, the compact horn 35 can pressure and weld together the sheet-like members S over the whole area of the welding range while at the same time the pressing position for the pressing surface 35*a* of the horn 35 to press down the sheet-like members S is moved continuously and reliably.

Since the pressuring means 4 maintains the ultrasonically vibrating horn 35 (resonator 31) in the low-frequency vibration in the pressing direction Z, it is difficult for the pressuring means 4 to accurately control a gap between the pressing surface 35a of the horn 35 being driven by the pressuring means 4 in the pressing direction Z and the backup surface 21 when the horn 35 pressures the sheet-like members S against the backup surface 21. Therefore, the pressuring means 4 is adapted to control the horn 35 to vibrate in a manner that the descending horn 35 applies the constant pressure of the predetermined value to the sheet-like members S. Thus, the horn 35 is prevented from excessively pressing down and pressuring the sheet-like members S fixedly placed on the backup surface 21. Therefore, the sheet-like members S are prevented from being broken by the pressure of the horn 35.

Relative to the welding range of the sheet-like members S, the pressing surface 35a of the horn 35 is configured to have the greater width in the width direction X orthogonal to the pressing direction Z and the movement direction Y and the shorter length Lh in the movement direction Y. Hence, the overlaid sheet-like members S fixedly placed on the backup surface 21 only need be moved by the movement means 5 relative to the pressing surface 35a of the horn 35 by a length Lm of the welding range in the movement direction Y whereby the pressing surface 35a of the horn 35 can efficiently pressure by pressing the sheet-like members S against the backup surface 21 over the whole area of the welding range.

There is provided the welding apparatus 1 having a practical structure where the stage 2 with the overlaid sheet-like members S fixedly placed on the backup surface 21 thereof is used as the backup member that is moved by the movement means 5 in the movement direction Y at the constant speed whereby the portion of sheet-like members S that faces the pressing surface 35a can be moved relative to the pressing surface 35a in the movement direction Y at the constant speed.

Second Embodiment

Figure 4:
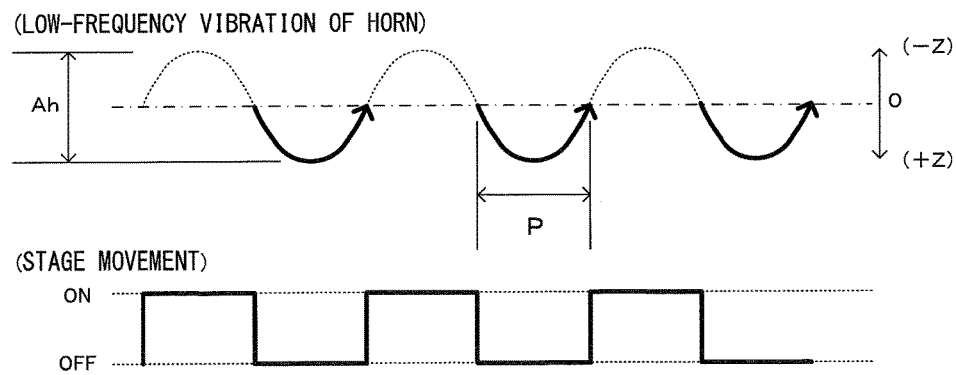
FIG. 4 is a chart for illustrating a movement state of a stage during a pressuring time of a welding apparatus according to a second embodiment of the invention.

A second embodiment of the invention is described with reference to FIG. 4. FIG. 4 is a chart for illustrating a movement state of a stage during a pressuring time of a welding apparatus according to the second embodiment of the invention.

This embodiment differs from the above-described first embodiment in that the movement of the stage 2 by the movement means 5 during the pressuring time P is disabled, as indicated by the solid line in FIG. 4, so that the stage 2 is at a standstill during the pressuring time P. Except for this, the arrangement and operations are the same as those of the above-described first embodiment and hence, like reference characters refer to the corresponding components, the description of which is dispensed with.

This embodiment can accomplish not only the same effect as that of the above-described embodiment but also the following effect. Specifically, the movement means 5 is disabled for moving the stage 2 with the sheet-like members S fixedly placed on the backup surface 21 thereof during the pressuring time P when the pressing surface 35a of the horn 35 presses the sheet-like members S against the backup surface 21 so that a great frictional force is produced. This is effective to obviate misalignment or breakage of the sheet-like members S clamped between the pressing surface 35 and the backup surface 21, which is caused by the frictional force produced in the pressuring time P.

This embodiment is arranged such that a movement speed of the stage 2 in the pressuring time P is decreased from a movement speed of the stage 2 in the time period other than the pressuring time P in one cycle of the low-frequency vibration period by disabling the movement of the stage 2 during the pressuring time P. An alternative arrangement may be made such that the stage 2 is simply moved in the movement direction Y by the movement means 5, whose speed of moving the stage 2 during the pressuring time P is set lower than a speed of moving the stage 2 during the time period other than the pressuring time P. In such an arrangement, the movement speed of the stage 2 by the movement means 5 is also decreased during the pressuring time P when the pressing surface 35a of the horn 35 produces the great frictional force by pressing the sheet-like members S against the backup surface 21. Thus is obviated the problem that the misalignment or breakage of the sheet-like members S clamped between the pressing surface 35 and the backup surface 21 is caused by the frictional force produced during the pressuring time P.

Further, the stage 2 or the head part 3 may be provided with a pressure sensor such as made of a load cell such that the pressure applied by the pressing surface 35a to the sheet-like members S can be detected by the pressure sensor. In this case, an arrangement may be made such that the pressure applied by the pressing surface 35a to the sheet-like members S is detected by the pressure sensor and the pressuring time P is detected based on the pressure detected by the pressure sensor, while the movement speed of the sheet-like members S (stage 2) during the pressuring time P is decreased from the movement speed of the sheet-like members S in the time period other than the pressuring time P in one cycle of the low-frequency vibration period. Namely, the movement speed of the sheet-like members S (stage 2) may be adjusted based on the pressure detected by the pressure sensor.

Third Embodiment

Figure 5:
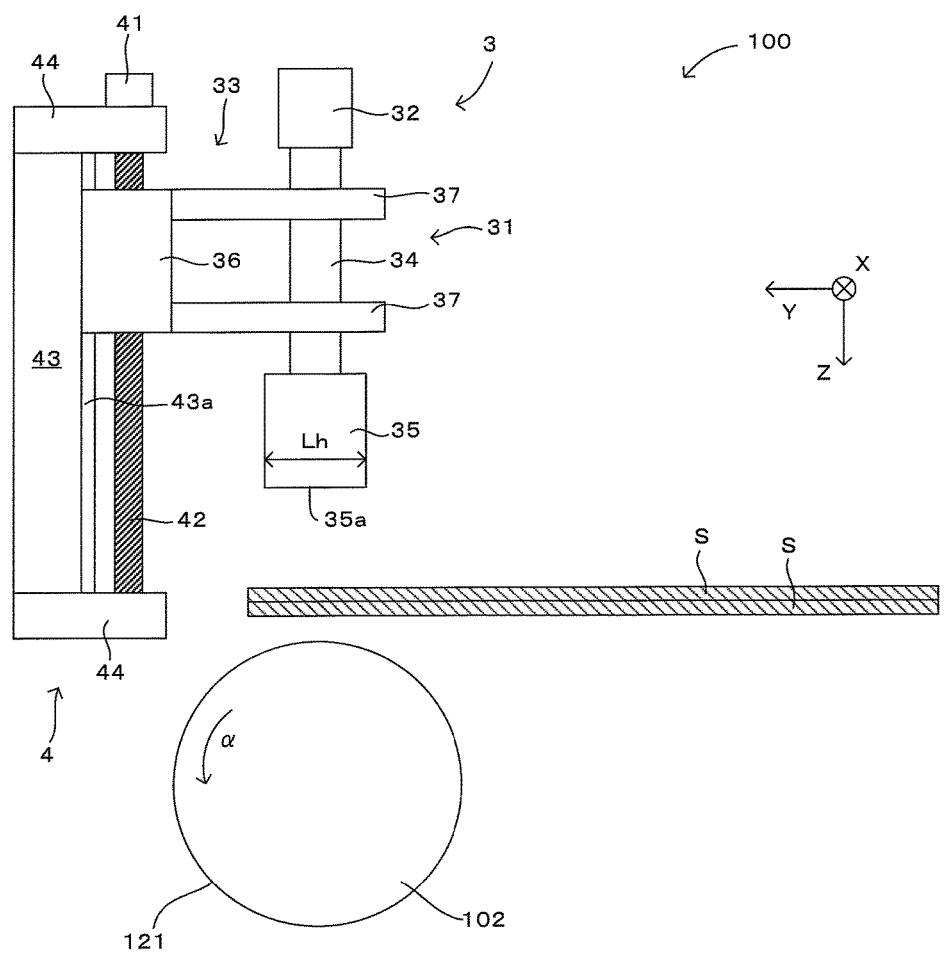
FIG. 5 is a side view showing a welding apparatus according to a third embodiment of the invention.

A third embodiment of the invention is described with reference to FIG. 5. FIG. 5 is a side view showing a welding apparatus according to the third embodiment of the invention.

This embodiment differs from the above-described first and second embodiments in that, as shown in FIG. 5, a welding apparatus 100 includes a rotary drum 102, as the backup member of the invention, which is disposed at place opposite the pressing surface 35a of the horn 35, and an outer peripheral surface 121 of which defines the backup surface of the invention. The following description focuses on the difference from the above-described first embodiment. Except for this, the arrangement and operations are the same as those of the above-described first embodiment and hence, like reference characters refer to the corresponding components, the description of which is dispensed with.

According to this embodiment, as shown in FIG. 5, the rotary drum 102 is rotated about a center axis thereof as the rotational center in a direction of arrow a as driven by movement means including a combination of a drive motor, pulley and the like (not shown). Specifically, the rotary drum 102 is driven by the movement means to rotate in a manner that a position on the outer peripheral surface 121 of the rotary drum 102, at which position the sheet-like members S are clamped between the rotary drum 102 and the pressing surface 35a of the horn 35, is moved at the constant speed in the movement direction Y. The overlaid sheet-like members S are driven by movement means including belt rollers, drive motor and the like (not shown) so as to move in the movement direction Y at the same speed as the circumferential speed of the rotary drum 102.

As described above, this embodiment can accomplish not only the same effect as that of the above-described first embodiment but also the following effect. Specifically, the rotary drum 102 with the backup surface defined by the outer peripheral surface 121 thereof is used as the backup member that is drivably rotated by the unillustrated movement means in a manner that the position on the outer peripheral surface 121 where the sheet-like members S are clamped between the outer peripheral surface 121 of the rotary drum 102 and the pressing surface 35a of the horn 35 is moved at the constant speed in the movement direction Y. Thus is provided the welding apparatus 100 having a practical structure where the sheet-like members S fed to the position on the outer peripheral surface 121 of the rotary drum 102 and opposite the pressing surface 35a is moved relative to the pressing surface 35a at the constant speed.

Incidentally, a plurality of overlaid sheet-like members S may be attached to an outer peripheral surface 102a of the rotary drum 102.

Fourth Embodiment

Figure 6:
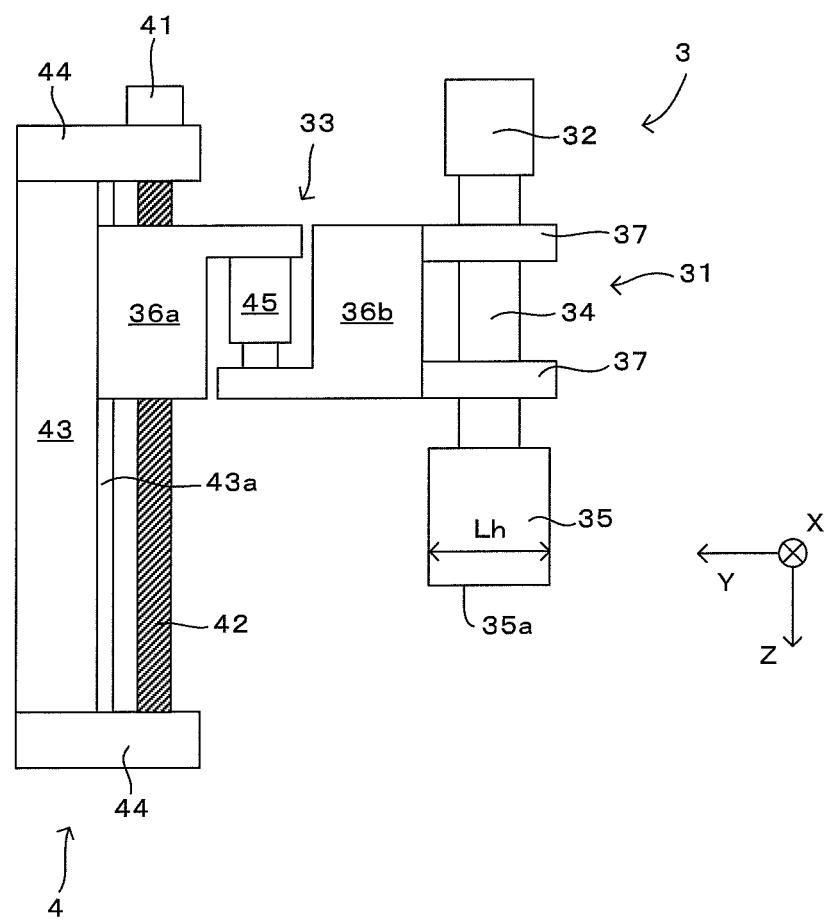
FIG. 6 is a side view showing a head part and pressuring means of a welding apparatus according to a fourth embodiment of the invention.

A fourth embodiment of the invention is described with reference to FIG. 6. FIG. 6 is a side view showing a head part and pressuring means of a welding apparatus according to the fourth embodiment of the invention.

This embodiment differs from the above-described embodiments in that the pressuring means 4 includes a cylinder 45 while a base 36a (of the support means 33) that is threadably engaged with the ball screw 42 of the pressuring means 4 via the screw hole thereof and a base 36b (of the support means 33) that is provided with the clamp means 37 are coupled together via the cylinder 45. According to this embodiment, an inflow of fluid such as air into the cylinder 45 is so set as to cause the cylinder to pressure the base 36b relative to the base 36a in the pressing direction Z (in a downward direction as seen in the figure) with a predetermined constant pressure. Except for this, the arrangement and operations are the same as those of the above-described embodiments and hence, like reference characters refer to the corresponding components, the description of which is dispensed with.

As described above, this embodiment can accomplish not only the same effect as that of the above-described embodiments but also the following effect. In this embodiment, when the resonator 31 is driven by the pressuring means 4 in the pressing direction Z so as to cause the pressing surface 35a of the horn 25 to pressure the overlaid sheet-like members S, as shown in FIG. 6, a piston moves in the cylinder 45 in response a stress from the sheet-like members S (stage 2) so that the pressing surface 35a of the horn 35 pressures the sheet-like members S with the same pressure as the predetermined constant pressure with which the cylinder 45 pressures the base 36b. During the pressuring time P, therefore, the pressing surface 35a of the horn 35 can more accurately pressure the sheet-like members S with the predetermined constant pressure.

Fifth Embodiment

Figure 7:
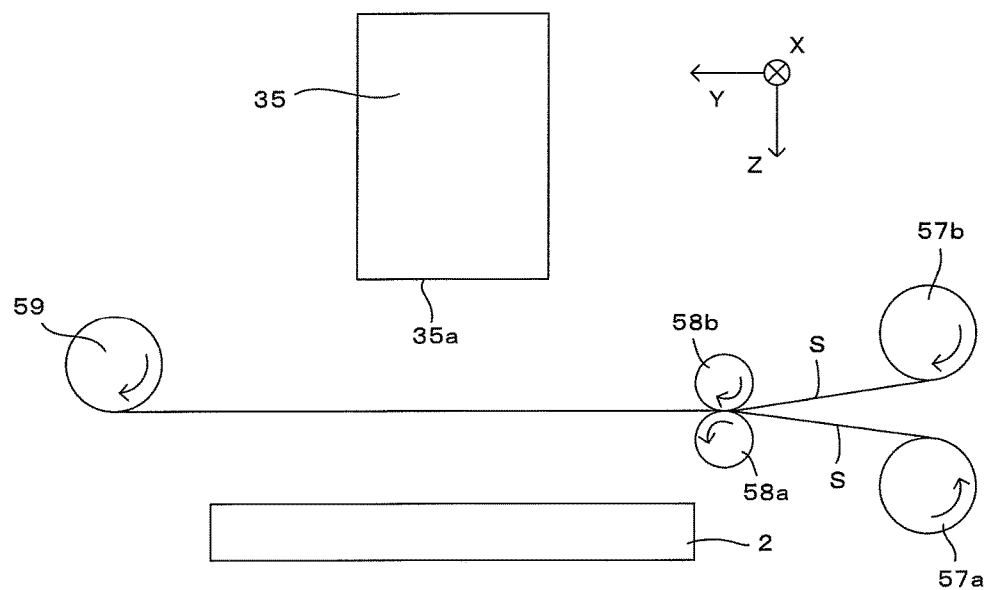
FIG. 7 is a diagram showing an example of a method for supplying sheet-like members to a welding apparatus according to a fifth embodiment of the invention.

A fifth embodiment of the invention is described with reference to FIG. 7. FIG. 7 is a diagram showing an example of a method for supplying the sheet-like members to a welding apparatus according to the fifth embodiment of the invention.

This embodiment differs from the above-described first embodiment in that the sheet-like members S, which are retainably wound around first and second feed rollers 57a, 57b, respectively, are brought into an overlaid relation by being nipped by a drive roller 58a and a driven roller 58b rotating in directions of arrows and are fed into space between the backup surface 21 of the stage 2 and the pressing surface 35a of the horn 35, as shown in FIG. 7. After pressured and welded together by the pressing surface 35a of the horn 35, the sheet-like members S are wound around a take-up roller 59 for storage. Except for this, the arrangement and operations are the same as those of the above-described embodiment and hence, like reference characters refer to the corresponding components, the description of which is dispensed with.

The sheet-like members S retainably wound around the first and second feed rollers 57a, 57b, respectively, are brought into the overlaid relation and fed to the position opposite the pressing surface 35a by, for example, the drive roller 58a and the take-up roller 59 rotated by unillustrated drive means such as drive motors in the direction of arrow in FIG. 7. Thus, the overlaid sheet-like members S are driven by the drive roller 58a and the take-up roller 59 to move relative to the pressing surface 35a at the predetermined movement speed whereby the sheet-like members S fresh from the first and second feed rollers 57a, 57b can be brought into the overlaid relation and fed into the space between the pressing surface 35a and the backup surface 21 in conjunction with winding the welded sheet-like members S around the take-up roller 59.

As described above, this embodiment can accomplish the same effect as that of the above-described embodiments. It is noted that the drive roller 58a and the take-up roller 59 function as "movement means" of the invention. According to this embodiment, the stage 2 need not necessarily be driven by the movement means.

Sixth Embodiment

Figure 8:
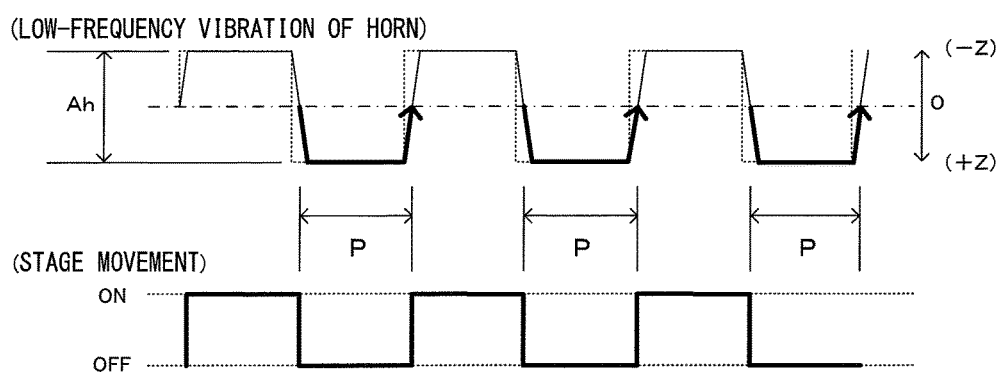
FIG. 8 is a chart for illustrating a movement state of a stage during a pressuring time of a welding apparatus according to a sixth embodiment of the invention.

A sixth embodiment of the invention is described with reference to FIG. 8. FIG. 8 is a chart for illustrating a movement state of a stage during a pressuring time of a welding apparatus according to the sixth embodiment of the invention.

This embodiment differs from the above-described second embodiment in that the pressuring means 4 induces the low-frequency vibration of a rectangular waveform in the resonator 31, as shown in FIG. 8. Except for this, the arrangement and operations are the same as those of the above-described embodiment and hence, like reference characters refer to the corresponding components, the description of which is dispensed with.

As indicated by the dotted line in FIG. 8, the pressuring means 4 is driven based on a control signal outputted from the controller so as to induce the low-frequency vibration of the rectangular waveform. The pressuring means 4 may sometimes exhibit some control lag in response to the control signal for driving the pressuring means 4 stepwise. In this case, the resonator 31 is caused to vibrate at low frequencies with a little control lag in response to the control signal of the rectangular waveform (the dotted line in FIG. 8) as indicated by the solid line in FIG. 8, for example. Similarly to the above-described second embodiment, the movement of the stage 2 by the movement means 5 is disabled so that the stage 2 is at a standstill during the pressuring time P indicated by the bold solid line in FIG. 8.

In the case where the pressuring means 4 exhibits the control lag, as described above, the movement speed of the sheet-like members S (the stage 2) may be adjusted based on a pressure detected by the pressure sensor for detecting a pressure of the pressing surface 35a on the sheet-like members S. This approach provides for reliable adjustment of the movement speed of the sheet-like members S (the stage 2) during the pressuring time P. Further, in the first and the third to fifth embodiments, the low-frequency vibration of the rectangular waveform may be induced in the resonator 31. Further, a duty ratio at which the resonator 31 is caused to vibrate at low frequencies of the rectangular waveform may be properly set according to the material or the like of the sheet-like member S as a welding object.

This embodiment can accomplish the same effect as that of the above-described second embodiment.

Seventh Embodiment

Figure 9:
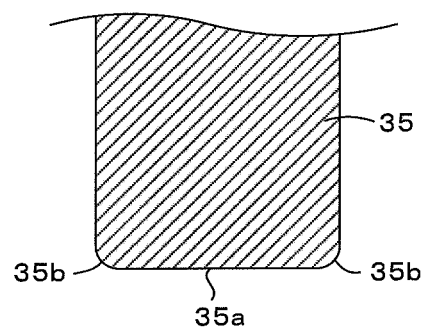
FIG. 9 is a vertical sectional view showing a horn of a welding apparatus according to a seventh embodiment of the invention.

A seventh embodiment of the invention is described with reference to FIG. 9. FIG. 9 is a vertical sectional view showing a horn of a welding apparatus according to the seventh embodiment of the invention.

This embodiment differs from the above-described embodiments in that, as illustrated by the horn 35 in FIG. 9, the pressing surface 35a of the horn 35 is formed with a curved surface 35b along the edges thereof by chamfering an angled part along the edges of the pressing surface 35a. Except for this, the arrangement and operations are the same as those of the above embodiments and hence, like reference characters refer to the corresponding components, the description of which is dispensed with.

If the angled part is formed along the edges of the pressing surface 35a, this angled part forms an edge, which involves a fear that the sheet-like member S may be broken at a portion contacted by the edge. However, the breakage of the sheet-like member S caused by the edge can be prevented by forming the curved surface 35b along the edges of the pressing surface 35a of the horn 35 as described above.

Eighth Embodiment

Figure 10:
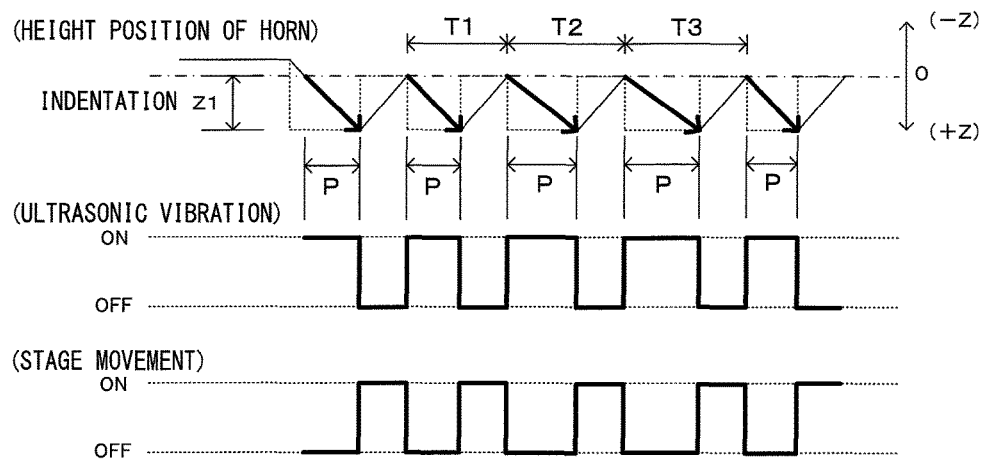
FIG. 10 is a timing chart for illustrating operations of a welding apparatus according to an eighth embodiment of the invention.

An eighth embodiment of the invention is described with reference to FIG. 10. FIG. 10 is a timing chart for illustrating operations of a welding apparatus according to the eighth embodiment of the invention.

This embodiment differs from the above-described sixth embodiment in that when a requirement for completing the welding is satisfied, a drive signal is outputted to terminate the pressing by the pressing surface 35a of the horn 35 and to return the horn 35 to the initial position (according to the embodiment, a contact position between the pressing surface 35a and the sheet-like member S), as illustrated by a diagram showing a height position of the horn 35 in FIG. 10. In this embodiment, a time when the pressing surface 35a of the horn 35 accomplishes a predetermined indentation Z1 after contacted on the sheet-like members S is previously set as the requirement for completing the welding. Further according to this embodiment, the ultrasonic vibration is applied during the pressuring time P. Except for this, the arrangement and operations are the same as those of the above-described embodiment and hence, like reference characters refer to the corresponding components, the description of which is dispensed with.

The pressuring means 4 is driven based on a drive signal from the controller so as to drive the horn 35 stepwise, as indicated by the dotted line in FIG. 10. To cause the pressing surface 35a to start pressuring the sheet-like members S, the controller outputs a control signal to drive the horn 35 stepwise in the Z direction by a predetermined amount Z1.

The application of the ultrasonic vibration is started when the pressing surface 35a starts pressuring the sheet-like members S. When the requirement for completing the welding is satisfied by the horn 35 achieving the predetermined indentation Z1 in the sheet-like members S, the controller outputs a control signal to drive the horn stepwise to return to the initial position. Alternatively, the controller may output a control signal to drive the horn 35 stepwise in the Z direction by more than the predetermined amount Z1 when causing the pressing surface 35a to start pressuring the sheet-like members S.

When the return movement of the horn 35 is started, the application of the ultrasonic vibration is stopped while the movement of the stage 2 is started, as shown in FIG. 10. When the stage 2 is moved a predetermined amount, the pressing surface 35a of the horn 35 starts again to pressure the sheet-like members S. An alternative arrangement may be made such that when the stage 2 is moved the predetermined amount, the pressing surface 35a of the horn 35 starts pressuring the sheet-like members S even though the return movement of the horn 35 is not completed. In a case where the horn completes the return movement before the predetermined amount of movement of the stage 2 is completed, the horn 35 may be made to wait at the initial position till the predetermined amount of movement of the stage 2 is completed. Otherwise, the movement of the stage 2 may be stopped while the pressing surface 35a of the horn 35 may start pressuring the sheet-like members S.

As described above, this embodiment ensures that the sheet-like members S are reliably welded together because the pressing surface 35a of the horn 35 continues to pressure the sheet-like members S till the requirement for completing the welding is satisfied.

The length of the pressuring time P that is required to satisfy the requirement for completing the welding varies from one pressuring operation to another depending upon the material, state and the like of the sheet-like material S as the welding object. However, the length of time to return the horn 35 is substantially fixed. According to this embodiment, therefore, respective low-frequency vibration periods T1, T2, T3 vary depending upon the length of the pressuring time P required to satisfy the requirement for completing the welding, while the duty ratio of the pressuring time P in the respective low-frequency vibration periods T1, T2, T3 also varies. Accordingly, this embodiment provides control such that the low-frequency vibration period of the horn 35 is varied according to the length of time required to satisfy the requirement for completing the welding.

This embodiment is so programmed as to stop the pressing by the pressing surface 35a of the horn 35 at a time when the horn 35, starting from the initial position, achieves the predetermined indentation Z1. However, an alternative arrangement may be made such that an actual contact position of the pressing surface 35a of the horn 35 with the sheet-like members S is detected based on the pressure or the like detected by the pressure sensor, and that the pressing by the pressing surface 35a of the horn 35 is stopped at the time when the horn 35, starting from the detected position, achieves the predetermined indentation Z1. This approach ensures that the pressing surface 35a of the horn 35 can reliably pressure the sheet-like members S by the predetermined indentation even though the sheet-like members S have undulation or the sheet-like members S are varied in thickness.

Ninth Embodiment

Figure 11:
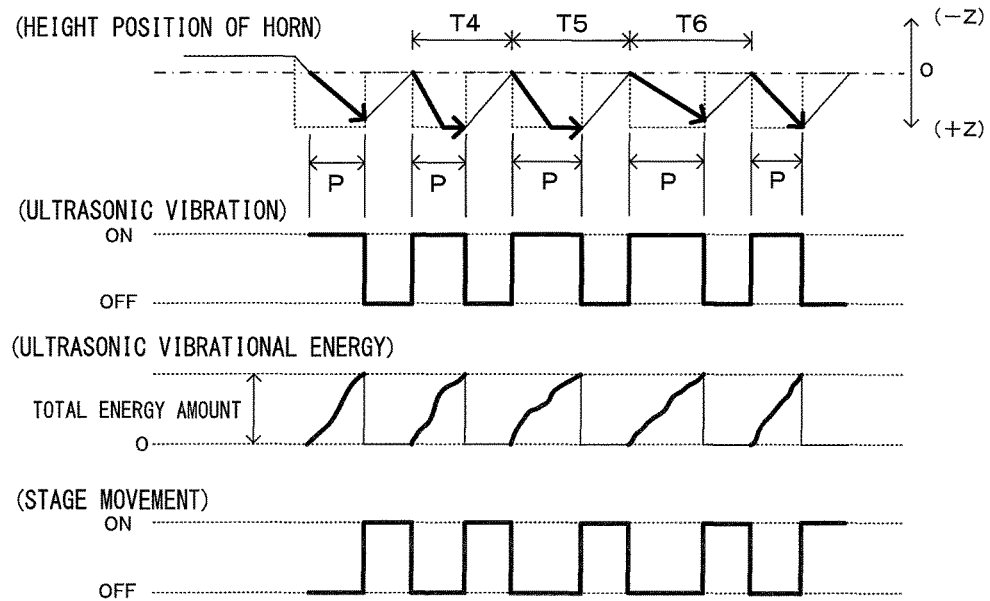
FIG. 11 is a timing chart for illustrating operations of a welding apparatus according to a ninth embodiment of the invention.

A ninth embodiment of the invention is described with reference to FIG. 11. FIG. 11 is a timing chart for illustrating operations of a welding apparatus according to the ninth embodiment of the invention.

This embodiment differs from the above-described eighth embodiment in that the requirement for completing the welding is different, as illustrated in FIG. 11 by a diagram showing a height position of the horn 35 and a diagram showing an ultrasonic vibrational energy. In this embodiment, a time when the total amount of ultrasonic vibrational energy (watt (W) or joule (J)) applied from the pressing surface 35a of the horn 35 to the sheet-like members S reaches a predetermined value is preset as the requirement for completing the welding. Further in this embodiment, the ultrasonic vibration is applied during the pressuring time P or until the total amount of ultrasonic vibrational energy applied to the sheet-like members S reaches the predetermined value. Except for this, the arrangement and operations are the same as those of the above-described eighth embodiment and hence, like reference characters refer to the corresponding components, the description of which is dispensed with.

The pressuring means 4 is driven based on the control signal from the controller so as to drive the horn 35 stepwise, as indicated by the dotted line in FIG. 11. To cause the pressing surface 35a to start pressuring the sheet-like members S, the controller outputs the control signal to drive the horn 35 stepwise in the Z direction by the predetermined amount Z1, for example. The application of the ultrasonic vibration is started when the pressing surface 35a starts pressuring the sheet-like members S. When the total amount of ultrasonic vibrational energy applied by the horn 35 reaches the predetermined value so that the requirement for completing the welding is satisfied, the controller outputs the control signal to drive the horn 35 stepwise to return to the initial position. As shown in the figure, it does not matter if the height position of the horn 35 varies at the time when the requirement for completing the welding is satisfied.

At the start of the return movement of the horn 35, the application of the ultrasonic vibration is stopped while the movement of the stage 2 is started, as shown in FIG. 11. When the stage 2 is moved the predetermined amount, the pressing surface 35a of the horn 35 starts again to pressure the sheet-like members S. An alternative arrangement may also be made such that when the stage 2 is moved the predetermined amount, the pressing surface 35a of the horn 35 starts pressuring the sheet-like members S even though the return movement of the horn 35 is not completed yet. In a case where the horn 35 completes the return movement before the stage 2 completes the predetermined amount of movement, the horn 35 may be made to wait at the initial position till the stage 2 completes the predetermined amount of movement. Otherwise, the movement of the stage 2 may be stopped while the pressing surface 35a of the horn 35 may start pressuring the sheet-like members S.

As described above, this embodiment ensures, similarly to the above-described eighth embodiment, that the sheet-like members S are reliably welded together because the pressing surface 35a of the horn 35 continues to pressure the sheet-like members S till the requirement for completing the welding is satisfied.

Similarly to the above-described eighth embodiment, the length of the pressuring time P that is required to satisfy the requirement for completing the welding varies from one pressuring operation to another depending upon the material, state and the like of the sheet-like material S as the welding object. However, the length of time to return the horn 35 is substantially fixed. According to this embodiment, therefore, respective low-frequency vibration periods T4, T5, T6 vary depending upon the length of the pressuring time P required to satisfy the requirement for completing the welding, while the duty ratio of the pressuring time P in the respective low-frequency vibration periods T4, T5, T6 also varies. Accordingly, this embodiment provides control such that the low-frequency vibration period of the horn 35 is varied according to the length of time required to satisfy the requirement for completing the welding.

In this embodiment, the requirement for the indentation Z1 according to the eighth embodiment may also be set as the requirement for completing the welding. In this case, when at least one of the requirement for the indentation and the requirement for the total energy amount is satisfied, it may be decided that the requirement for completing the welding is satisfied. Otherwise, when both of the requirements for the indentation and the total energy amount are satisfied, it may be decided that the requirement for completing the welding is satisfied.

In this embodiment, the ultrasonic vibration is applied to the sheet-like members S on the assumption that the pressing surface 35a of the horn 35 at the initial position is contacted on the sheet-like members S. However, an alternative arrangement may be made similarly to the above-described eighth embodiment such that the actual contact position of the pressing surface 35a of the horn 35 with the sheet-like members S is detected based on the pressure or the like detected by the pressure sensor and the pressing surface 35a of the horn 35 is operated based on the detected position so as to apply the ultrasonic vibration to the sheet-like members S. This approach ensures that the pressing surface 35a of the horn 35 can reliably apply the predetermined total amount of the ultrasonic vibrational energy to the sheet-like members S even though the sheet-like members S have undulation or the sheet-like members S have thickness variations.

It is noted that the invention is not limited to the above-described embodiments and a variety of changes or modifications other than the above can be made thereto without departing from the spirit or essential characteristics thereof.

In the above-described embodiments, the sheet-like members S as the welding object may be heated by heating means such as a heater when the sheet-like members S (welded body) are welded together by applying the ultrasonic vibration under pressure. It is generally known that the welding processing based on the ultrasonic vibration relies on the welding energy dependent on: a) the pressure on the welded body; b) the magnitude of amplitude of the ultrasonic vibration applied to the welded body; and c) the length of application of the ultrasonic vibration applied to the welded body.

In the above-described embodiments, there is a case where some kind of welded body dictates the need to reduce the pressure applied to the welded body or to shorten the length of application of the ultrasonic vibration to the welded body in order to permit the welded body to be reliably moved by the movement means in the direction orthogonal to the pressuring direction of the pressuring means. In this case, the welding energy applied to the welded body is reduced. In spite of the reduced welding energy applied to the pieces of welded body, however, the pieces of welded body can be reliably welded together by applying thermal energy thereto by heating, as described above.

Even when the pressure on the welded body is reduced, the length of application of the ultrasonic vibration to the welded body is shortened or the amplitude of the ultrasonic vibration is reduced in order to permit the welded body to be reliably moved by the movement means in the direction orthogonal to the pressuring direction of the pressuring means, therefore, the pieces of welded body can be reliably welded together by heating. Further, the heating is effective to stabilize the length of time required to satisfy the requirement for completing the welding. The heater for heating the welded body may be embedded in a hole formed in the stage (backup means) or in the horn (pressing body). Otherwise, a ceramic heater may be attached to the pressing surface of the horn.

While two overlaid sheet-like members S are welded together according to the above-described embodiments, three or more overlaid sheet-like members S may be welded together.

Any of the components described in the foregoing embodiments may be combined in anyway. For example, the above-described first and second embodiments may be arranged similarly to the third embodiment such that the overlaid sheet-like members S are fed to space between the pressing surface 35a of the horn 35 and the stage by means of the movement means including the belt rollers, drive motor and the like (not shown). Further, the above-described third embodiment may be arranged similarly to the fifth embodiment such that the sheet-like members S are overlaid on top of each other before fed to space between the pressing surface 35a of the horn 35 and the stage 2.

The movement direction of the overlaid sheet-like members S is not limited to the above-described direction of arrow Y but may be any direction that is substantially orthogonal to the pressing direction Z.

The structure or the configuration of the pressing body and the pressing surface is not limited to the structure of the above-described horn 35. The pressing body may have any structure that includes the pressing surface and is adapted to press the sheet-like members S against the backup surface via the pressing surface. For example, the horn 35 may be configured to be tapered like a beak toward the pressing surface 35a, as seen in side view. The pressure applied by the pressing body to the sheet-like members S may be set to an optimum value according to the material, thickness or the like of the sheet-like members S.

A plurality of horns 35 each including the pressing surface 35a narrow in width in the width direction X may be juxtaposed with respect to the welding range of the sheet-like members S so as to pressure the sheet-like members S. This approach permits the plural horns 35 to pressure the whole area of the welding range of the sheet-like members S. Alternatively, the sheet-like members S may be pressured by the horn 35 including the pressing surface 35a narrow in width in the width direction X, while shifting the horn in position in the width direction X. This approach permits a single horn 35 to pressure the sheet-like members S over the whole area of the welding range.

The pressuring means and the movement means of the invention are not limited to the above-described structures. The pressuring means and the movement means may be constructed in any way using a known actuator such as linear motor or cylinder so long as these means are capable of moving the stage 2, the rotary drum 102 or the resonator 31. Further, the movement means may be adapted to move the head part 2 relative to the sheet-like members S. Alternatively, the movement means may be so configured as to move both the head part 2 and the sheet-like members S relative to each other.

The locations of the pressing body and the backup member are not limited to the above-described example where the pressing member and the backup member are vertically arranged as seen on the drawing surface of FIG. 1. The vertical positional relation between the pressing body and the backup member may be inverted. Otherwise, the pressing member and the backup member may be laterally arranged with respect to the drawing surface of FIG. 1.

In the above-described embodiments, the sheet-like members S as the welding object may be cooled by air-cooling or water-cooling when the sheet-like members S (the welded body) are welded together by applying the ultrasonic vibration under pressure. This approach is effective to prevent the breakage of the sheet-like members S because an excessive application of the ultrasonic vibration to the sheet-like members S (welded body) is obviated.

The above-described requirement for completing the welding in the eighth and ninth embodiments may be used as a requirement for stopping the application of the ultrasonic vibration in the first to the seventh embodiments. This approach is effective to prevent the breakage of the sheet-like members S because an excessive application of the ultrasonic vibration to the sheet-like members S (welded body) is obviated.

INDUSTRIAL APPLICABILITY

The invention is applicable to a wide range of techniques for welding together a plurality of overlaid sheet-like members by pressing the sheet-like members in conjunction with the application of vibration.

The invention claimed is:

1. A welding apparatus for welding together a plurality of overlaid sheet-like members by pressing in conjunction with application of vibration, comprising:
   a backup member including a backup surface;
   a pressing body including a pressing surface smaller in area than a welding range of the sheet-like members, and operative to press the sheet-like members against the backup surface in a pressing direction by means of the pressing surface;
   movement means for moving a portion of the sheet-like members that faces the pressing surface relative to the pressing surface in a direction substantially orthogonal to the pressing direction; and
   vibration generating means for vibrating the pressing body, wherein
   the vibration generating means comprises:
   an oscillator which applies ultrasonic vibration to the sheet-like members from the pressing surface by inducing the ultrasonic vibration in the pressing body; and
   a pressuring part for pressuring the sheet-like members by pressing the sheet-like members against the backup surface by means of the pressing surface of the ultrasonically vibrating pressing body, and wherein
   the pressuring part drives the pressing body, ultrasonically vibrated by the oscillator, to repeatedly pressure the sheet-like members during a predetermined pressuring time in one cycle of a preset low-frequency vibration period while maintaining the pressing body in low-frequency vibration with the low-frequency vibration period in a vibrational direction parallel to the pressing direction, and
   the movement means is configured to move the backup member in the direction substantially orthogonal to the pressing direction with a movement speed during the pressuring time set lower than a movement speed during a time period other than the pressuring time in one cycle of the low-frequency vibration period, the backup member carrying the overlaid sheet-like members fixedly placed on the backup surface thereof.

2. A welding method for welding together a plurality of overlaid sheet-like members by pressing in conjunction with application of vibration, wherein when a pressing body including a pressing surface formed smaller in area than a welding range of the sheet-like members pressures the sheet-like members in a pressing direction by pressing the sheet-like members against a backup surface of a backup member by means of the pressing surface thereof, the pressing body, as ultrasonically vibrated by an oscillator, repeatedly pressures the sheet-like members during a predetermined pressuring time in one cycle of a preset low-frequency vibration period, while being maintained in low-frequency vibration with the low-frequency vibration period in a vibrational direction parallel to the pressing direction, in the meanwhile a portion of the sheet-like members that faces the pressing surface is moved relative to the pressing surface in a direction substantially orthogonal to the pressing direction, and the backup member is moved in the direction substantially orthogonal to the pressing direction with a movement speed during the pressuring time set lower than a movement speed during a time period other than the pressuring time in one cycle of the low-frequency vibration period, the backup member carrying the overlaid sheet-like members fixedly placed on the backup surface thereof.

* * * * *